(12) United States Patent
Smith

(10) Patent No.: US 6,364,149 B1
(45) Date of Patent: Apr. 2, 2002

(54) FLUID CONTAINER WITH A THERMALLY RESPONSIVE INSULATING SIDE WALL

(76) Inventor: Gregory Scott Smith, 1751 NW. Christine Ct., Portland, OR (US) 97228

( * ) Notice: Subject to any disclaimer, the term of this patent is extended or adjusted under 35 U.S.C. 154(b) by 0 days.

(21) Appl. No.: 09/412,856

(22) Filed: Oct. 5, 1999

(51) Int. Cl.$^7$ ................................................ A47J 41/00
(52) U.S. Cl. .............................. 220/592.2; 220/592.17; 220/62.12; 220/DIG. 9; 383/110; 229/403
(58) Field of Search .................... 220/560.05, 560.06, 220/FOR 147–149, FOR 151, 592.2, 592.21, 592.17, DIG. 9, 62.12; 229/403, 920; 383/3, 110, 112, 113, 116; 206/204

(56) References Cited

U.S. PATENT DOCUMENTS

| | | | |
|---|---|---|---|
| 2,100,895 A | * 11/1937 | Austin | 220/567.2 |
| 2,945,653 A | * 7/1960 | Atkin | 244/119 |
| 3,149,017 A | * 9/1964 | Ehrreich et al. | 383/116 |
| 3,627,162 A | 12/1971 | Dossin et al. | |
| 3,742,994 A | * 7/1973 | Pensak | 383/3 |
| 4,037,751 A | * 7/1977 | Miller et al. | 428/593 |
| 4,172,152 A | * 10/1979 | Carlisle | 383/110 |
| 4,268,615 A | * 5/1981 | Yonezawa | 430/320 |
| 4,718,899 A | * 1/1988 | Itoh et al. | 604/368 |
| 4,827,944 A | * 5/1989 | Nugent | 600/584 |
| 4,969,750 A | * 11/1990 | Russo et al. | 206/204 |
| 5,135,132 A | * 8/1992 | Potochnik | 229/403 X |
| 5,363,982 A | 11/1994 | Sadlier | |
| 5,460,323 A | * 10/1995 | Titus | 229/403 |
| 5,628,453 A | 5/1997 | MacLaughlin | |
| 5,639,540 A | * 6/1997 | Imaeda | 428/195 |
| 5,660,326 A | 8/1997 | Varano et al. | |
| 5,697,550 A | 12/1997 | Varano et al. | |
| RE35,830 E | 6/1998 | Sadlier | |
| 5,769,311 A | 6/1998 | Morita et al. | |
| 5,820,016 A | * 10/1998 | Stropkay | 229/403 |

FOREIGN PATENT DOCUMENTS

| | | | | |
|---|---|---|---|---|
| FR | 2655027 | * | 5/1991 | 20/504 |
| JP | 1114685 | * | 8/1994 | |
| JP | 6219474 | * | 8/1994 | 229/403 |

* cited by examiner

Primary Examiner—Stephen P. Garbe
Assistant Examiner—Joseph C. Merek
(74) Attorney, Agent, or Firm—Blakely Sokoloff Taylor & Zafman LLP

(57) ABSTRACT

A self-insulating fluid container having a novel thermally responsive side wall is disclosed. The side wall is constituted of multiple layers that thermally respond to the presence of fluid of at least a predetermined temperature in the fluid container in a coordinated manner. In one embodiment, the coordinated thermal response either creates or increases insulating air space between an innermost and an outermost one of the layers. In another embodiment, the coordinated thermal response increases insulation of an intermediate layer between an innermost and an outermost one of the layers. In one embodiment, the self-insulating container is a cup for holding a hot beverage.

6 Claims, 2 Drawing Sheets

FLUID CONTAINER WITH A THERMALLY RESPONSIVE INSULATING SIDE WALL

BACKGROUND OF THE INVENTION

1. Field of the Invention

The present invention relates to the field of fluid containers. More specifically, the present invention relates to fluid containers with self-insulating side walls.

2. Background Information

A number of beverage containers having self-insulating side walls formed with air spaces disposed in between the innermost and outermost layers are known in the art. See e.g. U.S. Pat. Nos. 5,752,653 and 5,542,599. The insulating air spaces of these prior art beverage containers are pre-formed between the layers at manufacturing time. These prior art containers suffer at least the disadvantage in that because of the pre-formed air spaces, the side walls take up more space than the side walls of conventional non-self-insulating beverage containers, resulting in the self-insulating beverage containers being less stackable than the conventional non-self-insulating beverage containers. The stacking attribute is a very important attribute for hot beverage cups. It is essential to allowing large quantities of these hot beverage cups to be produced, packaged and transported together.

Thus, a self-insulating container that can provide similar insulating advantage, but without compromising the stacking ability of the container is desired.

SUMMARY OF THE INVENTION

A fluid container having a novel thermally responsive side wall is disclosed. The side wall is constituted of multiple layers that thermally respond to the presence of fluid of at least a predetermined temperature in the fluid container in a coordinated manner. In one embodiment, the coordinated thermal response either creates or increases insulating air space between an innermost and an outermost one of the layers. In another embodiment, the coordinated thermal response increases insulation of an intermediate layer between an innermost and an outermost one of the layers.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention. The phrase "in one embodiment" will be used repeatedly. It generally does not refer to the same embodiment, although it may.

Figure 1:
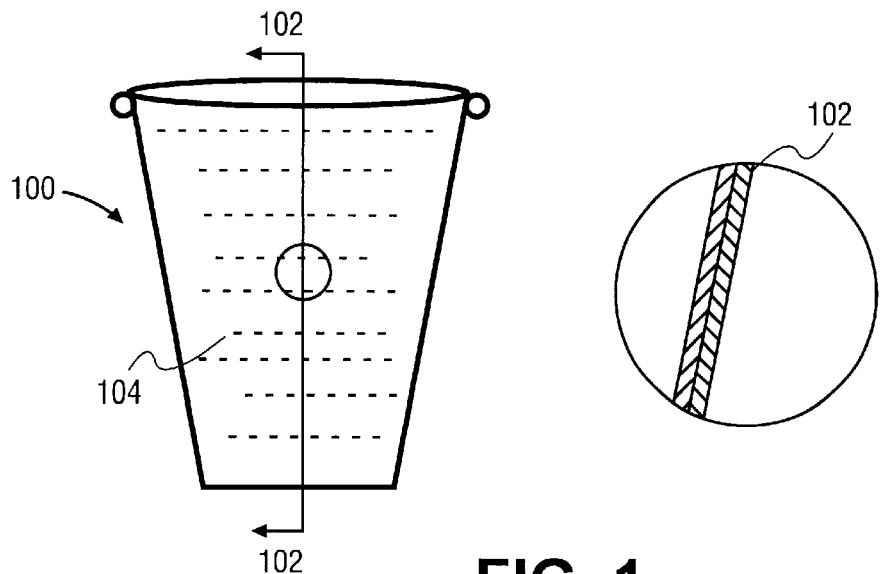
FIG. 1 illustrates the fluid container of the present invention in accordance with one embodiment.

Referring now to FIG. 1, wherein a side view of a fluid container of the present invention, in accordance with one embodiment in shown. As illustrated, fluid container 100 of the present invention includes multi-layered side wall 102. In accordance with the teachings of the present invention, multi-layered side wall 102 is designed to be thermally responsive in a coordinated manner to the presence of fluid 104 at a predetermined temperature in container 100. More specifically, the coordinated thermal response leads to the creation or increase of insulating air space, or increase of insulation of an intermediate layer, between an innermost and an outermost layer of side wall 102. As a result, depending on the application, either no air space or only a "minimal" air space/intermediate layer needs to be pre-formed at manufacturing time to provide for the self-insulating attribute at usage time. As those skilled in the art will appreciate, this elimination of the necessity of having to pre-form the required air space/intermediate layer makes container 100 as stackable as prior art non-self-insulating containers, and yet at usage time, provides the self-insulating attribute as the prior-art self-insulating containers with poor stacking attribute.

Before further describing thermally responsive side wall 102 in more detail, it should be noted that the present invention may be practiced on containers of other geometric shapes. The conical shape of container 100 shown in FIG. 1 is merely one such shape. Furthermore, the top and bottom part of container 100 may be joined in any one of a number of techniques known in the art. Fluid 104 may be any one of a number of known consumable or non-consumable liquids or solid-liquid mixtures. The responsive temperature threshold is application dependent. Preferably it is just below the typical temperature of the fluid designed to contain. For example, if the application is for holding a hot beverage, which is typically served at x degree Fahrenheit, side wall 102 should be designed to respond and create/increase the insulating air space/intermediate layer at x—delta degree Fahrenheit, where delta is a small differential.

Figure 2A:
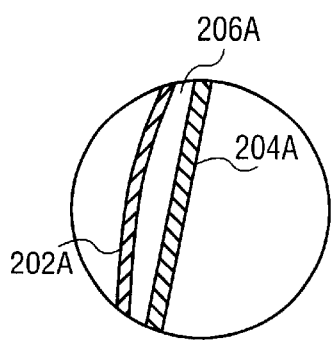
FIGS. 2a–2d illustrate the multi-layered side wall of FIG. 1 in further detail, in accordance with four embodiments.
Figure 2B:
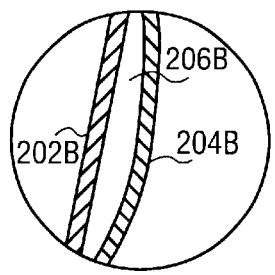

FIGS. 2a–2d illustrate side wall 102 in further detail in accordance with four embodiments. In each of these embodiments, side wall 102 is constituted with innermost and outermost layer pairs 202a and 204a, 202b and 204b, 202c and 204c or 202d and 204d. For the embodiments of FIG. 2a and 2b, innermost and outermost layer pairs 202a/204a and 202b/204b are designed to thermally respond in like manners, but differentially. That is, each layer pair either thermally responds by expanding or contracting together, however one layer (e.g. the innermost layer) would expand or contract more than the other layer (e.g. the outermost layer). FIG. 2a illustrates the case where outermost layer 204a contracts more than innermost layer 202a, as well as the case where outermost layer 204a expands less than innermost layer 202a. FIG. 2b illustrates the opposite cases, i.e. innermost layer 202b contracting more than outermost layer 204b, and innermost layer 202b expands less than outermost layer 204b.

Figure 2C:
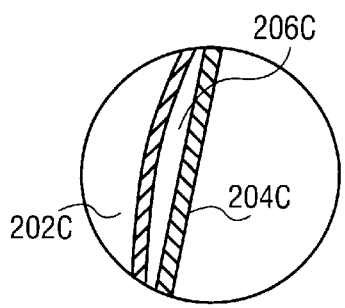
Figure 2D:
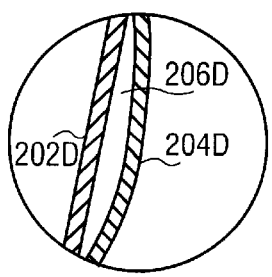

For the embodiments of FIGS. 2c and 2d, innermost and outermost layer pairs 202c/204c and 202d/204d are designed to thermally respond in opposite manners. That is, one layer (e.g. the innermost layer) would thermally respond by expanding, while the other layer (e.g. the outermost layer) would be thermally non-responsive or thermally respond by contracting. FIG. 2c illustrates the case where outermost layer 204c is thermally non-responsive or contracts, while innermost layer 202c expands. FIG. 2d illustrates the opposite case, i.e. innermost layer 202d is thermally non-responsive or contracts, while outermost layer 204d expands.

As illustrated, in each of these four cases, an insulating air space 206a, 206b, 206c or 206d is either created or the size of a pre-formed "minimal" air space is increased as a result of the thermal response.

Each layer may be constituted with a suitable one of thermally responsive materials known in the art (depending on the application, i.e. the thermally responsive temperature threshold).

Figure 3:
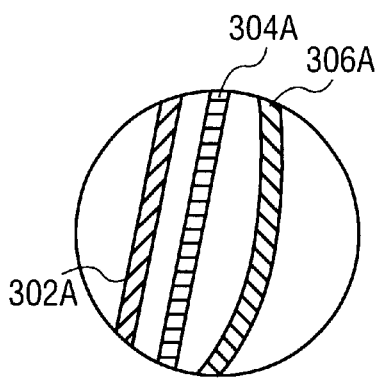
FIGS. 3a–3b illustrate the multi-layered side wall of FIG. 1 in further detail, in accordance with two other embodiments.
Figure 3:
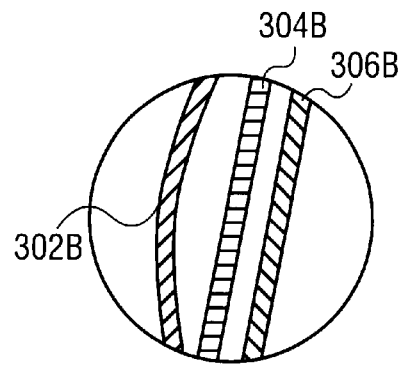

FIGS. 3a–3b illustrate multi-layered side wall 102 in accordance with two other embodiments. In each of these embodiments, side wall 102 is constituted with at least innermost layer 302a/302b, intermediate layer 304a/304b, and outermost layer 306a/306b. In alternate embodiments, more than one intermediate layer 304a/304b may be employed. For ease of understanding, innermost layer 302a/302b and outermost layer 306a/306b are assumed to be constituted with conventional materials that are considered to be thermally unresponsive at the desired operating temperature range. However, from the description to follow, those skilled in the art will appreciate that innermost layer 302a/302b and outermost layer 306a/306b may be thermally responsive as in one of embodiments of FIGS. 2a–2d.

Intermediate layer 304a is designed to thermally respond by contracting, while intermediate layer 304b is designed to thermally respond by expanding. In each case, a desired insulating air space or insulating intermediate layer is increased. Examples of suitable materials for use to constitute intermediate layer include heat shrink tubing made of vinyl, polyolefin or Teflon, available from 3M of Minneapolis-St Paul, Minn. In alternate embodiments, other thermally responsive materials with similar expansion characteristics may also be employed instead.

For each of these embodiments, the creation or the increase of the insulating air space/intermediate layer is further assisted by constituting innermost layer 302a/302b and outermost layer 306a/306b with materials having differential elasticity. More specifically, for the embodiment of FIG. 3a, outermost layer 306a is constituted with material that is more elastic than the material employed for innermost layer 304a, whereas an opposite arrangement is employed for the embodiment of FIG. 3b.

For each of these embodiments, the creation or the increase of the insulating air space/intermediate layer is further assisted by joining or bonding intermediate layer 304a/304b to innermost layer 302a/302b and outermost layer 306a/306b using adhesives with different adhesive strength. More specifically, for the embodiment of FIG. 3a, intermediate layer 304a is joined to outermost layer 306a with a weaker adhesive than the adhesive employed for innermost layer 302a, whereas an opposite arrangement is employed for the embodiment of FIG. 3b. The "weaker" adhesive is designed to "break down" in view of the force exerted by the contraction/expansion of intermediate layer 304a/304b.

Figure 4:
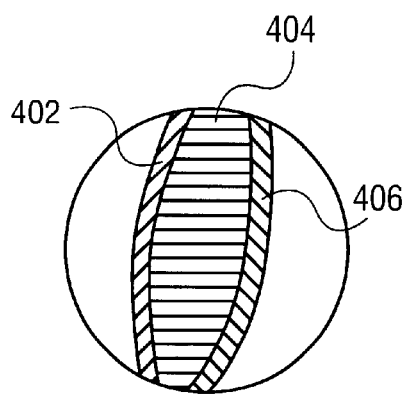
FIG. 4 illustrates the multi-layered side wall of FIG. 1 in further detail, in accordance with yet another embodiment.

FIG. 4 illustrates multi-layered side wall 102 in accordance with yet another embodiment. For the illustrated embodiment, side wall 102 is constituted with at least innermost layer 402, intermediate layer 404, and outermost layer 406. In alternate embodiments, more than one intermediate layer 404 may be employed. Again, for ease of understanding, innermost layer 402 and outermost layer 406 are assumed to be constituted with conventional materials that are considered to be thermally unresponsive at the desired operating temperature range. However, again from the description to follow, those skilled in the art will appreciate that innermost layer 402 and outermost layer 406 may be thermally responsive as in one of embodiments of FIGS. 2a–2d.

Intermediate layer 404 is designed to thermally respond by expanding. More specifically, intermediate layer 404 is constituted with an absorbent material. An example of such absorbent material is Silica Gel available through Canada Impex of Toronto, Canada. In alternate embodiments, other absorbent materials with similar expansion characteristics, such as polymeric gels or wood pulp may also be employed instead. In this embodiment, innermost layer 402 is permeable or semi-permeable, allowing some amount of fluid to pass through and be absorbed by intermediate layer 404.

Thus, a fluid container having a novel thermal responsive side wall has been described. While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A fluid container comprising a side wall having a plurality of layers that respond to the presence of fluid in said fluid container, said plurality of layers include an intermediate layer, an innermost layer and an outermost layer, wherein the innermost layer remains unchanged and the outermost ones of said plurality of layers expands due to absorption of said fluid by said intermediate layer, said intermediate layer is constituted with an absorbent material, and said innermost layer is constituted with a porous material that allows some of said fluid to be absorbed by said intermediate layer to insulate the outermost layer from the innermost layer.

2. The fluid container of claim 1, wherein the intermediate layer is bonded to said innermost and outermost layers with adhesive of different adhesive strength.

3. The fluid container of claim 1, wherein the fluid container is a cup and the fluid is a hot beverage.

4. A cup comprising a side wall having a plurality of layers that respond to the presence of a fluid in said cup, said plurality of layers include an intermediate layer, an innermost layer and an outermost layer, wherein the innermost layer remains unchanged and the outermost ones of said plurality of layers expands due to absorption of said fluid by said intermediate layer, said intermediate layer is constituted with an absorbent material, and said innermost layer is constituted with a porous material that allows some of said fluid to be absorbed by said intermediate layer to insulate the outermost layer from the innermost layer.

5. The cup of claim 4, wherein the intermediate layer is bonded to the innermost and outermost layers with adhesives of different adhesive strength.

6. The cup of claim 4, wherein the fluid is a hot beverage.

* * * * *